United States Patent
Xiong et al.

(10) Patent No.: US 11,657,314 B1
(45) Date of Patent: May 23, 2023

(54) MICROWAVE-TO-OPTICAL QUANTUM TRANSDUCERS

(71) Applicant: International Business Machines Corporation, Armonk, NY (US)

(72) Inventors: Chi Xiong, Yorktown Heights, NY (US); Jason S. Orcutt, Katonah, NY (US); Ricardo Alves Donaton, Cortlandt Manor, NY (US); Stephen M. Gates, Ossining, NY (US); Swetha Kamlapurkar, Yorktown Heights, NY (US); Abram L Falk, Port Chester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 17/191,178

(22) Filed: Mar. 3, 2021

(51) Int. Cl.
  *G06N 10/00* (2022.01)
  *B82Y 20/00* (2011.01)
  *G02F 1/035* (2006.01)

(52) U.S. Cl.
  CPC .............. *G06N 10/00* (2019.01); *B82Y 20/00* (2013.01); *G02F 1/0356* (2013.01); *G02F 2203/15* (2013.01)

(58) Field of Classification Search
  CPC ...... G06N 10/00; B82Y 20/00; G02F 2203/15
  See application file for complete search history.

(56) References Cited

U.S. PATENT DOCUMENTS

| | | | | |
|---|---|---|---|---|
| 4,879,533 A | * | 11/1989 | de Muro | H01P 1/2136 333/202 |
| 6,066,598 A | * | 5/2000 | Ishikawa | H01P 7/082 257/E39.011 |
| 6,734,638 B2 | * | 5/2004 | Kang | H01J 65/044 315/39 |
| 6,920,253 B2 | * | 7/2005 | Tan | G02B 6/12007 359/347 |

(Continued)

FOREIGN PATENT DOCUMENTS

| | | |
|---|---|---|
| CN | 106646738 A | 5/2017 |
| DE | 112017001164 T5 | 11/2018 |

(Continued)

OTHER PUBLICATIONS

McKenna et al. | Cryogenic microwave-to-optical conversion using a triply resonant lithium-niobate-on-sapphire transducer. Optica. vol. 7, No. 12, Dec. 2020, 9 pages. https://doi.org/10.1364/OPTICA.397235.

(Continued)

*Primary Examiner* — Andrew Jordan
(74) *Attorney, Agent, or Firm* — Amin, Turocy & Watson, LLP

(57) ABSTRACT

Techniques regarding microwave-to-optical quantum transducers are provided. For example, one or more embodiments described herein can include an apparatus that can include a microwave resonator on a dielectric substrate and adjacent to an optical resonator, and a photon barrier structure at least partially surrounding an optical resonator, wherein the photon barrier structure is configured to provide isolation of the microwave resonator from optical photons in the dielectric substrate outside the photon barrier structure.

20 Claims, 10 Drawing Sheets

(56) References Cited

U.S. PATENT DOCUMENTS

| | | | |
|---|---|---|---|
| 7,941,014 B1* | 5/2011 | Watts | G02B 6/1223 385/32 |
| 8,447,145 B2 | 5/2013 | Goldring et al. | |
| 9,260,289 B2* | 2/2016 | Park | B82Y 20/00 |
| 9,270,385 B2* | 2/2016 | Meyers | H04B 10/70 |
| 9,296,609 B2 | 3/2016 | Park | |
| 9,350,460 B2 | 5/2016 | Paik | |
| 9,660,721 B2 | 5/2017 | Polzik et al. | |
| 9,857,609 B2 | 1/2018 | Bishop et al. | |
| 9,885,888 B2* | 2/2018 | Bishop | H01P 7/086 |
| 9,922,289 B2 | 3/2018 | Abdo | |
| 9,927,636 B2* | 3/2018 | Bishop | G06N 10/00 |
| 10,295,582 B2 | 5/2019 | Bishop et al. | |
| 10,446,700 B2 | 10/2019 | Wang et al. | |
| 10,578,891 B1* | 3/2020 | Schmeing | G06N 10/00 |
| 10,672,971 B2 | 6/2020 | Brink et al. | |
| 10,782,590 B2 | 9/2020 | Witmer et al. | |
| 10,858,240 B2 | 12/2020 | Painter et al. | |
| 2003/0057840 A1* | 3/2003 | Kang | H01J 65/044 315/39 |
| 2005/0074194 A1* | 4/2005 | Tan | G02B 6/12007 385/1 |
| 2008/0310463 A1* | 12/2008 | Maleki | H01S 5/1032 372/20 |
| 2014/0314419 A1* | 10/2014 | Paik | B82Y 10/00 398/115 |
| 2015/0055961 A1* | 2/2015 | Meyers | G06N 10/00 398/140 |
| 2015/0060756 A1* | 3/2015 | Park | B81B 7/0093 257/9 |
| 2017/0148972 A1* | 5/2017 | Thompson | G06N 10/00 |
| 2017/0227795 A1* | 8/2017 | Bishop | G02B 6/29341 |
| 2017/0248832 A1 | 8/2017 | Kippenberg et al. | |
| 2017/0261770 A1 | 9/2017 | Bishop et al. | |
| 2017/0261771 A1* | 9/2017 | Bishop | G02B 6/29341 |
| 2018/0003753 A1 | 1/2018 | Bishop et al. | |
| 2018/0101787 A1* | 4/2018 | Abdo | H01P 1/20381 |
| 2018/0113373 A1 | 4/2018 | Witmer et al. | |
| 2018/0247974 A1* | 8/2018 | Oliver | H01L 39/045 |
| 2019/0043919 A1* | 2/2019 | George | H01L 28/10 |
| 2019/0067779 A1* | 2/2019 | U-Yen | H01L 23/552 |
| 2019/0147359 A1* | 5/2019 | Chen | H01L 39/025 257/31 |
| 2019/0296210 A1 | 9/2019 | Brink et al. | |
| 2020/0321506 A1* | 10/2020 | Kelly | H01L 39/025 |
| 2022/0146905 A1* | 5/2022 | Falk | G02F 1/3501 |

FOREIGN PATENT DOCUMENTS

| | | |
|---|---|---|
| EP | 0 735 606 B1 | 1/2002 |
| WO | 2017/131831 A2 | 8/2017 |
| WO | 2018002770 A1 | 1/2018 |
| WO | 202018095 A1 | 1/2020 |
| WO | 2020180956 A1 | 9/2020 |

OTHER PUBLICATIONS

Witmer et al. | A silicon-organic hybrid platform for quantum microwave-to-optical transduction. Cornell University, Quantum Physics, Dec. 21, 2019, 31 pages. http://arxiv.org/abs/1912.10346.

Holzgrafe et al. | Cavity electro-optics in thin-film lithium niobate for efficient microwave-to-optical transduction. Cornell University, Quantum Physics, May 12, 2020, 19 pages. arXiv:2005.00939v2.

Orcutt et al. | Engineering electro-optics in SiGe/Si waveguides for quantum transduction. Quantum Sci. Technol., vol. 5, No. 3, 034006, May 5, 2020, 14 pages, https://iopscience.iop.org/article/10.1088/2058-9565/ab84c1/pdf.

Mirhosseini, et al. "Superconducting qubit to optical photon transduction." Nature 588.7839 (2020): 599-603.

Xu, et al. "Bidirectional electro-optic conversion reaching 1% efficiency with thin-film lithium niobate." arXiv preprint arXiv:2012.14909 (2020).

Orcutt, et al, "Engineering electro-optics in SiGe/Si waveguides for quantum transduction," Quant. Sci. Tech, 5, 034006 (2020).

Andrews, et al., "Bidirectional and efficient conversion between microwave and optical light," arXiv:1310.5276v2 [physics.optics] Aug. 11, 2014, 17 pages.

List of IBM Patents or Applications Treated as Related.

Konaka et al., "Characteristics of microwave planar transmission lines using superconducting oxide films", Electronics and Communications in Japan (Part II: Electronics), vol. 75, No. 8, Aug. 1, 1992, pp. 83-94.

International Search Report and Written Opinion received for PCT Application Serial No. PCT/EP2022/054847 dated Jul. 7, 2022, 14 pages.

Tsioutsios et al., "Free-standing silicon shadow masks for transmon qubit fabrication", arxiv.org, Cornell University Library, 201 Olin Library Cornell University Ithaca, NY 14853, Aug. 16, 2020, doi: 10.1063/1.5138953, 8 pages.

Lu et al, "Schottky diodes from asymmetric melal-nanolube contacts," Appl Phys Lett 88, 133501 (2006), DOI:10.1063/1.2190707, 4 pages.

Bullock et al, "Effcienl silicon solar cells with dopant-free asymmetric heleroconlacts," Nature Energy 1, 15031 (2016), 7 pages.

Rabbani, et al, "Pholoresponse of silicon with asymmetric area contacts," Semiconductor Sci. Techn. 32, 015001 (2016), 7 pages.

Falk et al, "Quantum Transducers With Embedded Optical Resonators," U.S. Appl. No. 17/191,275, filed Mar. 3, 2021, 32 pages.

Falk et al, "Active Electro-Optic Quantum Transducers Comprising Resonators With Switchable Nonlinearities," U.S. Appl. No. 17/094,365, filed Nov. 10, 2020, 45 pages.

Gentry, et al. "Monolithic Source of Entangled Photons with Integrated Pump Rejection," Conference on Lasers and Electro-Optics OSA Technical Digest (online) (Optica Publishing Group, May 13-18, 2018), paper JTh4C.3 •https://doi.org/10.1364/CLEO_AT.2018.JTh4C.3.

* cited by examiner

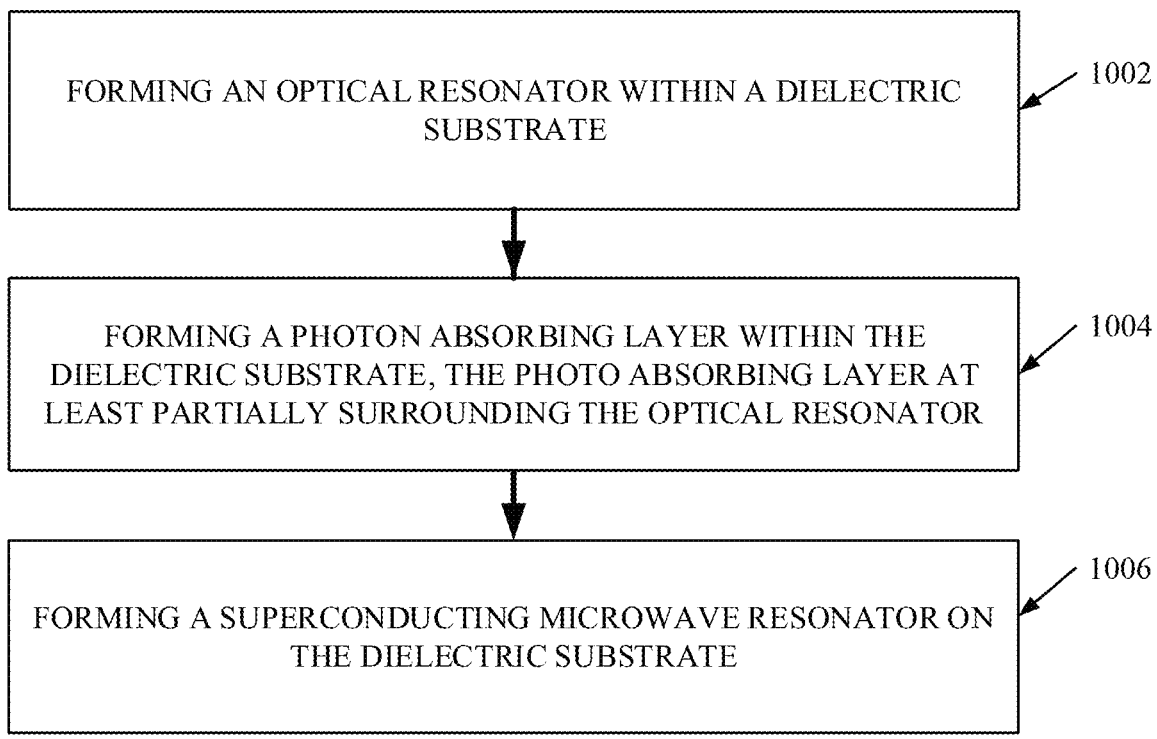

MICROWAVE-TO-OPTICAL QUANTUM TRANSDUCERS

STATEMENT REGARDING FEDERALLY SPONSORED RESEARCH OR DEVELOPMENT

This invention was made with Government support under W911NF-18-1-0022 awarded by Army Research Office (ARO). The Government has certain rights to this invention.

BACKGROUND

The subject disclosure relates to microwave-to-optical quantum transducers with embedded photon barrier structures, and more specifically, to microwave-to-optical quantum transducer architectures that can mitigate microwave quality factor degradation from optical photons.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, apparatus, systems, devices, and/or methods regarding quantum microwave-to-optical transducers are described.

According to an embodiment, an apparatus is provided. The apparatus can comprise a microwave resonator on a dielectric substrate and adjacent to an optical resonator, and a photon barrier structure at least partially surrounding an optical resonator, wherein the photon barrier structure is configured to provide isolation of the microwave resonator from optical photons in the dielectric substrate outside the photon barrier structure.

According to another embodiment, an apparatus is provided. The apparatus can comprise a dielectric substrate, a microwave resonator on the dielectric substrate and including superconducting waveguide. The apparatus can also comprise an optical resonator positioned in the dielectric substrate. Also, the apparatus can comprise a photon barrier structure at least partially surrounding the optical resonator.

According to an embodiment, a method is provided. The method can comprise forming an optical resonator in a dielectric substrate. The method can also comprise forming a photon barrier structure in the dielectric substrate. The photon barrier structure can be at least partially surrounding the optical resonator. Further, the method can comprise forming a superconducting microwave resonator on the dielectric substrate.

BRIEF DESCRIPTION OF THE DRAWINGS

FIG. 10 illustrates a flow diagram of an example, non-limiting method of manufacturing one or more quantum transducers comprising one or more photon barrier structures in accordance with one or more embodiments described herein.

DETAILED DESCRIPTION

Figure 1A:
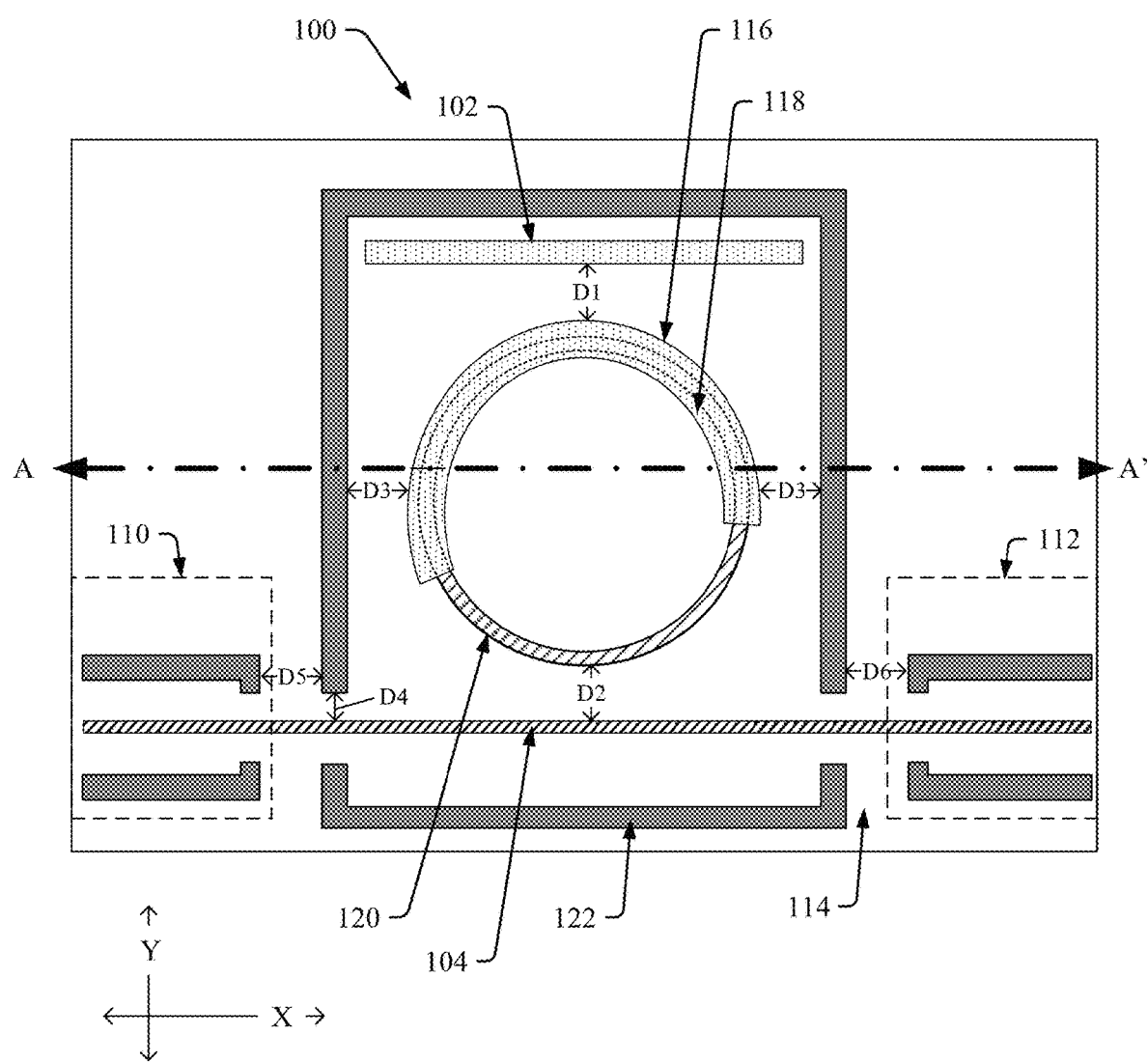
FIG. 1A illustrates a diagram of an example, non-limiting top-down view of a quantum transducer comprising one or more isolation trenches in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Long-distance networks of superconducting quantum computers can involve quantum transducers that convert single photons from microwave frequencies up to the infrared telecommunication domain (e.g., 1550 nanometers (nm)). The energy of a microwave photon is less than the thermal background energy of room temperature; therefore, room-temperature quantum information links at microwave frequencies can be extremely challenging. However, infrared photons can travel long distances in optical fibers without attenuation or interference. Quantum transducers linked to other superconducting quantum processors can then convert the photon from the infrared back to the microwave domain.

One of the key problems in electro-optic quantum transduction is the need to have high optical and microwave quality factors to achieve the highest efficiency of quantum transduction. The transduction efficiency is proportional to the square of the intrinsic optical and microwave quality factors. While the integration of microwave circuits generally does not harm the optical quality factor, the presence of optical frequency photons in the vicinity of the microwave resonators can significantly degrade the microwave quality factor by: introducing quasi-particles in the superconductor; and/or increasing the environment temperature. Thus, minimizing the degradation of the microwave quality factor due to the optical photons can increase an efficiency of the quantum transducer.

However, the microwave resonators must be closely integrated spatially with optical resonators to achieve high electro-optic coupling. Also, a high-power optical pump is needed to enhance the transduction efficiency. Further, conventional fiber-to-chip couplers are 50% efficiency, meaning more than half of the uncoupled light is scattered and propagating in the experimental space. A predominant path for the optical photons to reach the superconducting circuits is through the uncoupled light in the silicon substrates on which the transducers are built. Because the substrate typically has a higher refractive index than that of the air, most of the uncoupled light is expected to be confined and propagating in the substrate.

Various embodiments described herein can include apparatuses, devices, systems, and/or methods regarding quantum transducer architectures that can mitigate microwave degradation caused by optical photons. One or more embodiments described herein can regard one or more quantum transducers that rely on electro-optic coupling between microwave microstrip geometry and one or more optical resonators. Further, one or more microwave resonators in the quantum transducers can be isolated to a significant extent from optical photons in a substrate by deep trenches containing (e.g., filled with) a photon absorbing material. For example, the trenches can be positioned around the input and/or output on-chip fiber couplers to filter out light from an optical pump. Additionally, the one or more trenches, and thereby photon barrier structures, can extend within the substrate to and/or from a superconducting ground plane of a microwave resonator of the quantum transducer. In various embodiments, the trenches can contain (e.g., filled with) polysilicon degenerately doped with phosphorus to the $10^{20}$ per centimeter$^3$ (cm$^{-3}$) level in order to achieve sufficient absorption to telecommunication wavelength (e.g., 1550 nm) optical photons. Further, one or more microwave resonators in the quantum transducers can be isolated to a significant extent from optical photons in a substrate by deep trenches containing (e.g., filled with) metallic material, such as one or more metals such as niobium or other metals or combinations of metals. Further, the deep trenches can also contain (e.g., be filled with) combinations of metallic material and polysilicon material. For example, one or more layers of metal can be deposited into the trench and one or more layers of polysilicon can be deposited into the same trench.

As described herein, the terms "deposition process" and/or "deposition processes" can refer to any process that grows, coats, deposits, and/or otherwise transfers one or more first materials onto one or more second materials. Example deposition processes can include, but are not limited to: physical vapor deposition ("PVD"), chemical vaper deposition ("CVD"), electrochemical deposition ("ECD"), atomic layer deposition ("ALD"), low-pressure chemical vapor deposition ("LPCVD"), plasma enhanced chemical vapor deposition ("PECVD"), high density plasma chemical vapor deposition ("HDPCVD"), sub-atmospheric chemical vapor deposition ("SACVD"), rapid thermal chemical vapor deposition ("RTCVD"), in-situ radical assisted deposition, high temperature oxide deposition ("HTO"), low temperature oxide deposition ("LTO"), limited reaction processing CVD ("LRPCVD"), ultrahigh vacuum chemical vapor deposition ("UHVCVD"), metalorganic chemical vapor deposition ("MOCVD"), physical vapor deposition ("PVD"), chemical oxidation, sputtering, plating, evaporation, spin-on-coating, ion beam deposition, electron beam deposition, laser assisted deposition, chemical solution deposition, a combination thereof, and/or the like.

As described herein, the terms "epitaxial growth process" and/or "epitaxial growth processes" can refer to any process that grows an epitaxial material (e.g., a crystalline semiconductor material) on a deposition surface of another semiconductor material, in which the epitaxial material being grown has substantially the same crystalline characteristics as the semiconductor material of the deposition surface. in an epitaxial deposition process, chemical reactants provided by source gases (e.g., a silicon andior germanium containing gas) and/or source liquids can be controlled, and the system parameters can he set, so that the depositing atoms arrive at the deposition surface with sufficient energy to move about on the surface and orient themselves to the crystal arrangement of the atoms of the deposition surface. Therefore, the grown epitaxial material has substantially the same crystalline characteristics as the deposition surface on which the epitaxial material is formed. For example, an epitaxially grown semiconductor material deposited on a <100> orientated crystalline surface can take on a <100> orientation. Example epitaxial growth processes can include, but are not limited to: vapor-phase epitaxy ("VPE"), molecular-beam epitaxy ("MBE"), liquid-phase epitaxy ("LPE"), combination thereof, and/or the like.

As described herein, the terms "etching process", "etching process", "removal process", and/or "removal processes" can refer to any process that removes one or more first materials from one or more second materials. Example etching and/or removal processes can include, but are not limited to: wet etching, dry etching (e.g., reactive ion etching ("RIE")), chemical-mechanical planarization ("CMP"), a combination thereof, and/or the like.

As described herein, the terms "lithography process" and/or "lithography processes" can refer to the formation of three-dimensional relief images or patterns on a semiconductor substrate for subsequent transfer of the pattern to the substrate. In semiconductor lithography, the patterns can be formed by a light sensitive polymer called a photo-resist. To build the complex structures that make up a semiconductor device and the many wires that connect the various features of a circuit, lithography processes and/or etch pattern transfer steps can be repeated multiple times. Each pattern being printed on the wafer can be aligned to the previously formed patterns and slowly the subject features (e.g., conductors, insulators and/or selectively doped regions) can be built up to form the final device.

As described herein the term "superconducting" can characterize a material that exhibits superconducting properties at or below a superconducting critical temperature, such as aluminum (e.g., superconducting critical temperature of 1.2 Kelvin) or niobium (e.g., superconducting critical temperature of 9.3 Kelvin). Additionally, one of ordinary skill in the art will recognize that other superconductor materials (e.g., hydride superconductors, such as lithium/magnesium hydride alloys) can be used in the various embodiments described herein.

FIG. 1A illustrates a diagram of an example, non-limiting top-down view of an exemplary quantum transducer 100 in accordance with one or more embodiments described herein. Repetitive description of like elements employed in other embodiments described herein is omitted for sake of brevity. The quantum transducer 100 can be, for example, a microwave-to-optical quantum transducer that can efficiently transfer the quantum state of a microwave photon to that of an optical photon and vice versa. In various embodiments, the quantum transducer 100 can include one or more microwave transmission lines 102 and/or one or more optical waveguides 104. As shown in FIG. 1A, the one or more microwave transmission lines 102 can be configured to be laterally contained within the confines of the one or more photon barrier structures 122, and source connections to the microwave transmission line 102 can be made, for example, with wirebonds. In various embodiments, the one or more optical waveguides 104 can extend from, for example, an optical input section (e.g., a single optical photon input section 110 that can be coupled to a pump laser input) to an optical output section, such as a single optical photon output section 112.

In one or more embodiments, the one or more microwave transmission lines 102 can comprise one or more superconducting materials. Example superconducting materials that can be comprised within the one or more microwave transmission lines 102 can include, but are not limited to: niobium, niobium nitride, titanium nitride, a combination thereof, and/or the like. The one or more microwave transmission lines 102 can have a width (e.g., along the "Y" axis shown in FIG. 1A) ranging from, for example, greater than or equal to 5 micrometers (μm) and less than or equal to 20 μm. In various embodiments, the one or more microwave transmission lines 102 can be positioned on a dielectric substrate 114. In one or more embodiments, the one or more optical waveguides 104 can comprise one or more transparent, and/or substantially transparent, materials. Example materials that can be comprised within the one or more optical waveguides 104 can include, but are not limited to: silicon germanium, lithium niobate, aluminum nitride, a combination thereof, and/or the like. The one or more optical waveguides 104 can have a width (e.g., along the "Y" axis shown in FIG. 1A) ranging from, for example, greater than or equal to 1 μm and less than or equal to 10 μm. In various embodiments, the one or optical waveguides 104 can be positioned within the dielectric substrate 114.

The dielectric substrate 114 can be crystalline, semi-crystalline, microcrystalline, or amorphous. The dielectric substrate 114 can comprise essentially (e.g., except for contaminants) a single element (e.g., silicon or germanium) and/or a compound (e.g., aluminum oxide, silicon dioxide, gallium arsenide, silicon carbide, silicon germanium, a combination thereof, and/or the like). The dielectric substrate 114 can also have multiple material layers, such as, but not limited to: a semiconductor-on-insulator substrate ("SeOI"), a silicon-on-insulator substrate ("SOI"), germanium-on-insulator substrate ("GeOI"), silicon-germanium-on-insulator substrate ("SGOI"), a combination thereof, and/or the like. Additionally, the dielectric substrate 114 can also have other layers, such as oxides with high dielectric constants ("high-K oxides") and/or nitrides. In one or more embodiments, the dielectric substrate 114 can be a silicon wafer. In various embodiments, the dielectric substrate 114 can comprise a single crystal silicon (Si), silicon germanium (e.g., characterized by the chemical formula SiGe), a Group III-V semiconductor wafer or surface/active layer, sapphire, garnet, a combination thereof, and/or the like.

As shown in FIG. 1A, one or more microwave resonators 116 can be positioned adjacent to the one or more microwave transmission lines 102. In one or more embodiments, the one or more microwave resonators 116 can comprise one or more superconducting waveguides 118. The one or more superconducting waveguides 118 can comprise one or more superconducting materials. Example superconducting materials that can be comprised within the one or more superconducting waveguides 118 can include, but are not limited to: niobium, niobium nitride, titanium nitride, a combination thereof, and/or the like. In various embodiments, the one or more superconducting waveguides 118 can be positioned on the dielectric substrate 114. In one or more embodiments, the one or more superconducting waveguides 118 can be spaced from the one or more microwave transmission lines 102 by at least a first distance D1 ranging from, for example, greater than or equal to 1 μm and less than or equal to 100 μm.

Additionally, in one or more embodiments, the one or more microwave resonators 116 can further include one or more ground planes positioned under the dielectric substrate 114. For clarity purposes, the one or more ground planes are not shown in FIG. 1A, but are depicted in the cross-sectional views of the quantum transducer 100 illustrated in FIGS. 2, 4-5, and 8-9.

Also shown in FIG. 1A, one or more optical resonators 120 can be positioned adjacent to the one or more optical waveguides 104 and/or between the single optical photon input section 110 and single optical photon output section 112. In one or more embodiments, the one or more optical resonators 120 can comprise one or more transparent, and/or substantially transparent, materials. Example materials that can be comprised within the one or more optical resonators 120 can include, but are not limited to: silicon germanium, lithium niobate, aluminum nitride, a combination thereof, and/or the like. In various embodiments, the one or optical resonators 120 can be positioned within the dielectric substrate 114. Additionally, the one or more optical resonators 120 can be spaced from the one or more optical waveguides 104 by at least a second distance D2 ranging from, for example, greater than or equal to 100 nm and less than or equal to 2 μm.

While FIG. 1A depicts the one or more superconducting waveguides 118 and/or optical resonators 120 having circular geometries, the architecture of the quantum transducer 100 is not so limited. For example, embodiments in which the one or more superconducting waveguides 118 and/or optical resonators 120 have alternate geometries (e.g., elliptical or polygonal geometries) are also envisaged. Further, FIG. 1A depicts the one or more superconducting waveguides 118 and optical resonators 120 aligned with each other. For example, the one or more optical resonators 120 can be positioned under the one or more superconducting waveguides 118 (e.g., where the position of the one or more optical resonators 120 under the one or more superconducting waveguides 118 is delineated with dashed lines in FIG. 1A). However, the architecture of the quantum transducer 100 is not so limited. For example, embodiments in which the one or more superconducting waveguides 118 and optical resonators 120 are misaligned with each other are also envisaged.

Additionally, the quantum transducer 100 can comprise one or more photon barrier structures 122. In various embodiments, the one or more photon barrier structures 122 can block and/or absorb optical photons of a desired wavelength. For instance, the one or more photon barrier structures 122 can block and/or absorb optical photons having a wavelength ranging from, for example, greater than or equal to 300 nm and less than or equal to 2000 (e.g., 1550 nm). Accordingly, the photon barrier structures 122 thereby can be configured to provide isolation of the microwave resonator 116 to a significant extent from optical photons in the dielectric substrate 114 that come from outside the photon barrier structures 122. Example materials that can be comprised within the one or more photon barrier structures 122 can include, but are not limited to: degenerately doped polysilicon (e.g., doped with phosphorous to a $10^{20}$ cm$^{-3}$ level), metallic materials including one or more metals, a superconducting material (e.g., niobium, niobium nitride, titanium nitride), a combination thereof, and/or the like.

As shown in FIG. 1A, the one or more photon barrier structures 122 can surround the one or more microwave resonators 116 and/or optical resonators 120. For example, the one or more photon barrier structures 122 can be positioned within the dielectric substrate 114 (e.g., adjacent to the one or more optical resonators 120). Additionally, one or more photon barrier structures 122 can be positioned surrounding the single optical photon input section 110 and/or the single optical photon output section 112; thereby further shielding the one or more microwave resonators 116 and/or optical resonators 120 from ambient optical photons. As depicted in FIG. 1A, the one or more photon barrier structures 122 can form a perimeter around the one or more microwave resonators 116 and/or optical resonators 120, where the one or more optical waveguides 104 can extend through the perimeter. In various embodiments, the one or more photon barrier structures 122 can be positioned away from the one or more microwave resonators 116 and/or optical resonators 120 by at least a third distance D3 ranging from, for example, greater than or equal to 100 μm and less than or equal to 1000 μm. Additionally, the one or more photon barrier structures 122 can be positioned away from the one or more optical waveguides 104 by at least a fourth distance D4 ranging from, for example, greater than or equal to 1 μm and less than or equal to 100 μm.

While FIG. 1A depicts the one or more single optical photon input sections 110 and/or single optical photon output sections 112 within close proximity to the one or more microwave resonators 116 and/or optical resonators 120, the architecture of the quantum transducer 100 is not so limited. For example, the one or more photon barrier structures 122 surrounding the one or more single optical photon input sections 110 and/or single optical photon output sections 112 can be spaced from the one or more photon barrier structures 122 surrounding the one or more microwave resonators 116 and/or optical resonators 120 by a distance (e.g., represented by "D5" and/or "D6") ranging from, for example, greater than or equal to 1 millimeter and less than or equal to 1 centimeter.

Figure 1B:
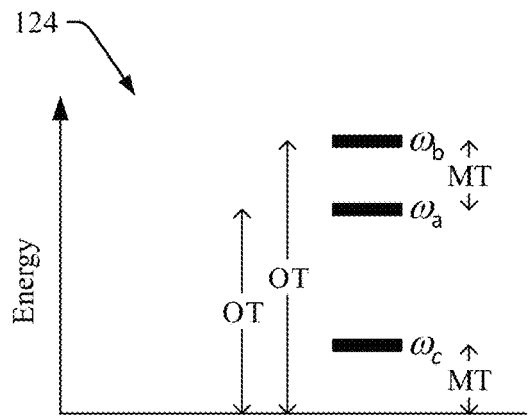
FIG. 1B illustrates a diagram of an example, non-limiting graph of optical and/or microwave transitions that can characterize operation of one or more quantum transducers in accordance with one or more embodiments described herein.

FIG. 1B illustrates a diagram of an example, non-limiting graph 124 that can depict optical and/or microwave transitions that can be experienced by the one or more quantum transducers 100 in accordance with one or more embodiments described herein. Repetitive description of like elements employed in other embodiments described herein is omitted for sake of brevity. Graph 124 can depict optical transitions (e.g., represented by "OT" arrows) that can be experienced by the quantum transducer 100 as the energy state of the one or more microwave resonators 116 and/or optical resonators 120 increases. Also, graph 124 can depict microwave transitions (e.g., represented by "MT" arrows) that can be experienced by the quantum transducer 100 as the energy state of the one or more microwave resonators 116 and/or optical resonators 120 increases. "$\omega_a$" can represent a first optical mode of the optical resonator 120, "$\omega_b$" can represent a second optical mode of the optical resonator 120, and "$\omega_c$" can represent a microwave mode of the microwave resonator 116.

Figure 2:
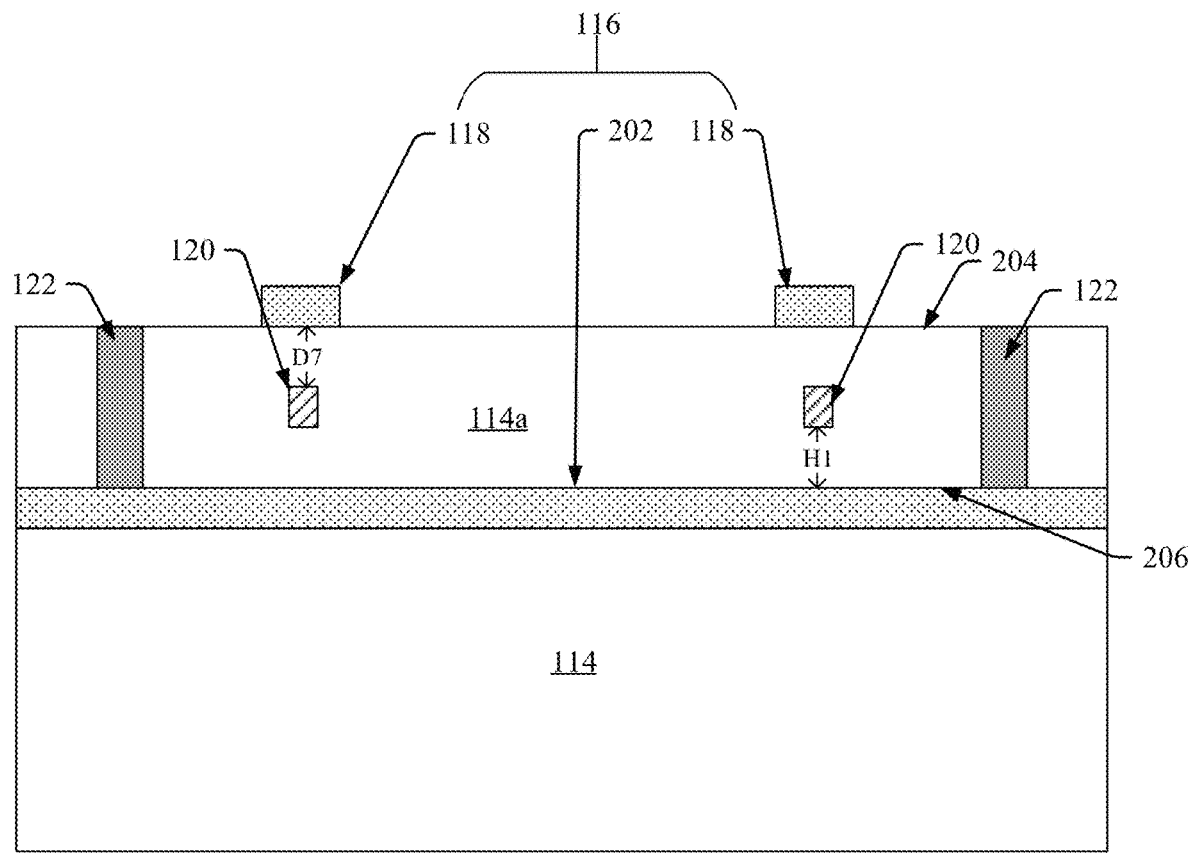
FIG. 2 illustrates a diagram of an example, non-limiting cross-sectional view of a quantum transducer having a microstrip architecture and one or more photon barrier structures in accordance with one or more embodiments described herein.

FIG. 2 illustrates a diagram of an example, non-limiting cross-sectional view of the quantum transducer 100 in accordance with one or more embodiments described herein. Repetitive description of like elements employed in other embodiments described herein is omitted for sake of brevity. FIG. 2 can depict a cross-section of the quantum transducer 100 along the A-A' plane depicted in FIG. 1A. As shown in FIG. 2, the one or more microwave resonators 116 can include the one or more superconducting waveguides 118 and a superconducting ground plane 202, separated from each other by at least a portion of the dielectric substrate 114. Thereby, the one or more microwave resonators 116 can have a microstrip architecture (e.g., as shown in FIG. 2).

In one or more embodiments, the superconducting ground plane 202 can comprise one or more superconducting materials. Example superconducting materials that can be comprised within the superconducting ground plane 202 can include, but are not limited to: niobium, niobium nitride, titanium nitride, a combination thereof, and/or the like. For instance, the one or more superconducting waveguides 118 and the superconducting ground plane 202 can have the same, or substantially the same, composition. Further, the superconducting ground plane 202 can have a thickness (e.g., along the "Z" axis shown in FIG. 2) ranging from, for example, greater than or equal to 50 nm and less than or equal to 5 μm.

In various embodiments, the one or more superconducting waveguides 118 can be positioned on the dielectric substrate 114, while the one or more optical resonators 120 can be positioned within the dielectric substrate 114. Thereby, the one or more superconducting waveguides 118 can be positioned above the one or more optical resonators 120 (e.g., along the "Z" axis depicted in FIG. 2). For example, the position of the one or more superconducting waveguides 118 can overlap the position of the one or more optical resonators 120 along a vertical plane (e.g., along the "Z" axis shown in FIG. 2). As shown in FIG. 2, a first portion 114a of the dielectric substrate 114 can house the one or more optical resonators 120 and/or the one or more photon barrier structures 122. The one or more superconducting waveguides 118 can be positioned at a first surface 204 of the first portion 114a of the dielectric substrate 114, while the superconducting ground plane 202 can be positioned at a second surface 206 of the first portion 114a of the dielectric substrate 114. Further, the first surface 204 and the second surface 206 can be at opposite sides of the first portion 114a of the dielectric substrate 114.

In one or more embodiments, a width (e.g., along the "X" axis shown in FIG. 2) of the one or more superconducting waveguides 118 can be greater than a width (e.g., along the "X" axis shown in FIG. 2) of the one or more optical resonators 120 (e.g., as shown in FIG. 2). In one or more embodiments, the widths of the one or more superconducting waveguides 118 and/or optical resonators 120 can be equal. The width (e.g., along the "X" axis shown in FIG. 2) of the one or more superconducting waveguides 118 can range from, for example, greater than or equal to 5 μm and less than or equal to 20 μm. The width (e.g., along the "X" axis shown in FIG. 2) of the one or more optical resonators can range from, for example, greater than or equal to 1 μm and less than or equal to 10 μm.

In one or more embodiments, a thickness (e.g., along the "Z" axis shown in FIG. 2) of the one or more superconducting waveguides 118 can be greater than a thickness (e.g., along the "Z" axis shown in FIG. 2) of the one or more optical resonators 120. In one or more embodiments, the widths of the one or more superconducting waveguides 118 and/or optical resonators 120 can be equal (e.g., as shown in FIG. 2). The thickness (e.g., along the "Z" axis shown in FIG. 2) of the one or more superconducting waveguides 118 can range from, for example, greater than or equal to 50 nm and less than or equal to 5 μm. The thickness (e.g., along the "Z" axis shown in FIG. 2) of the one or more optical resonators 120 can range from, for example, greater than or equal to 100 nm and less than or equal to 1 μm.

In various embodiments, the one or more optical resonators 120 can be positioned within the dielectric substrate 114 at a height H1 from the superconducting ground plane 202 ranging from, for example, greater than or equal to 1 μm and less than or equal to 10 μm. Additionally, the one or more optical resonators 120 can be vertically spaced (e.g., along the "Z" axis shown in FIG. 2) from the one or more superconducting waveguides 118 by a seventh distance D7 ranging from, for example, greater than or equal to 1 μm and less than or equal to 10 μm. Further, the one or more photon barrier structures 122 can have a thickness (e.g., along the "Z" axis shown in FIG. 2) ranging from, for example, greater than or equal to 10 μm and less than or equal to 100 μm. Also, the one or more photon barrier structures 122 can have a width (e.g., along the "X" axis shown in FIG. 2) ranging from, for example, greater than or equal to 2 μm and less than or equal to 10 μm. As shown in FIG. 2, the one or more photon barrier structures 122 can extend from the superconducting ground plane 202, through the first portion 114a of the dielectric substrate 114 (e.g., adjacent to the one or more optical resonators 120), to the first surface 204 of the first portion 114a of the dielectric substrate 114. Thereby, the one or more photon barrier structures 122 can at least partially surround (e.g., on a horizontal plane) the one or more microwave resonators 116 and/or optical resonators 120.

Figure 3:
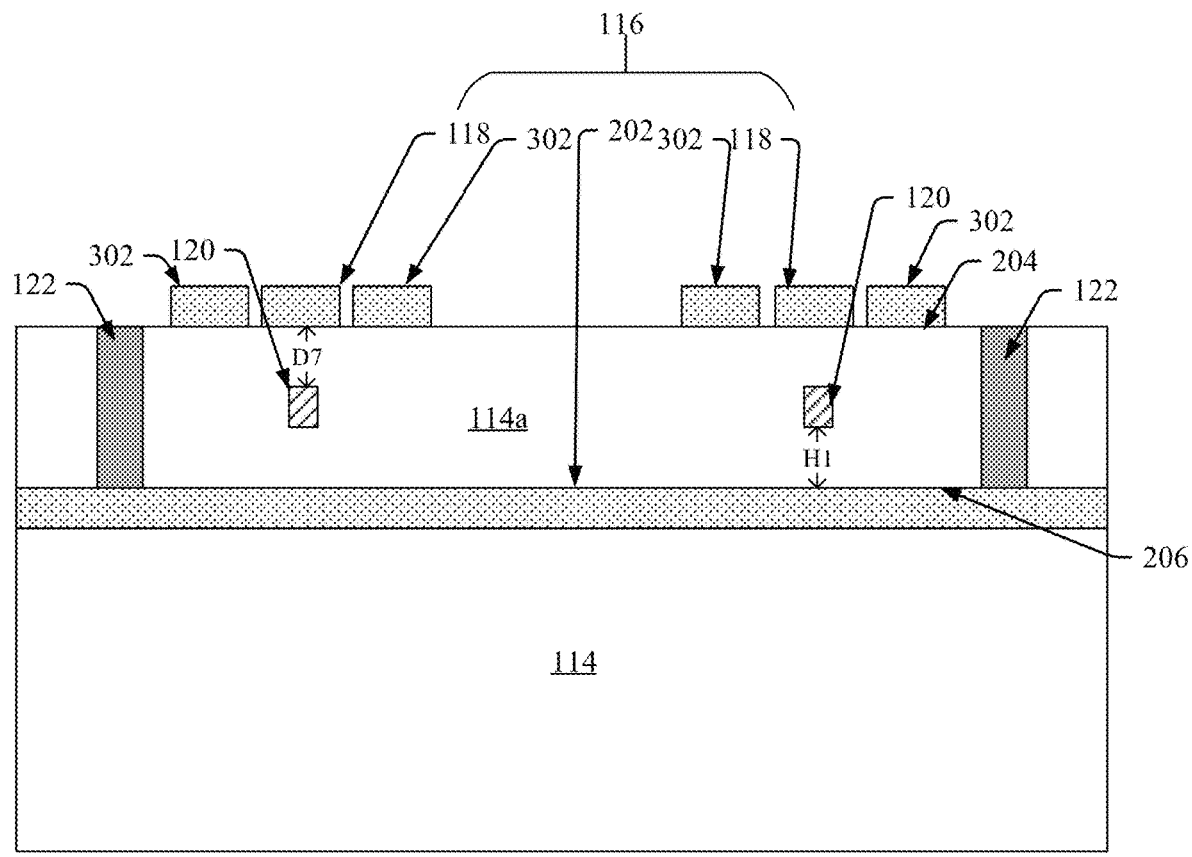
FIG. 3 illustrates a diagram of an example, non-limiting cross-sectional view of a quantum transducer having a co-planar waveguide architecture and one or more photon barrier structures in accordance with one or more embodiments described herein.

FIG. 3 illustrates a diagram of an example, non-limiting cross-sectional view of the quantum transducer 100 in accordance with one or more embodiments described herein. Repetitive description of like elements employed in other embodiments described herein is omitted for sake of brevity. FIG. 3 can depict a cross-section of the quantum transducer 100 along the A-A' plane depicted in FIG. 1A. As shown in FIG. 3, the one or more microwave resonators 116 can include the one or more superconducting waveguides 118, superconducting ground plane 202, and/or one or more second superconducting ground planes 302. The one or more superconducting waveguides 118 and second superconducting ground planes 302 can be separated from the superconducting ground plane 202 by at least a portion of the dielectric substrate 114. Thereby, the one or more microwave resonators 116 can have a co-planar waveguide ("CPW") architecture (e.g., as shown in FIG. 3).

In one or more embodiments, the one or more second superconducting ground planes 302 can comprise one or more superconducting materials. Example superconducting materials that can be comprised within the one or more second superconducting ground planes 302 can include, but are not limited to: niobium, niobium nitride, titanium nitride, a combination thereof, and/or the like. For instance, the one or more superconducting waveguides 118, the superconducting ground plane 202, and the one or more second superconducting ground planes 302 can have the same, or substantially the same, composition. Further, the one or more second superconducting ground planes 302 can have a thickness (e.g., along the "Z" axis shown in FIG. 2) ranging from, for example, greater than or equal to 50 nm and less than or equal to 5 μm.

As shown in FIG. 3, the one or more second superconducting ground planes 302 can be positioned on the dielectric substrate 114 adjacent to the one or more superconducting waveguides 118. Also, the one or more second superconducting ground planes 302 can be horizontally spaced (e.g., along the "X" axis shown in FIG. 3) from the one or more superconducting waveguides 118 by a distance ranging from, for example, greater than or equal to 2 μm and less than or equal to 20 μm.

Figure 4:
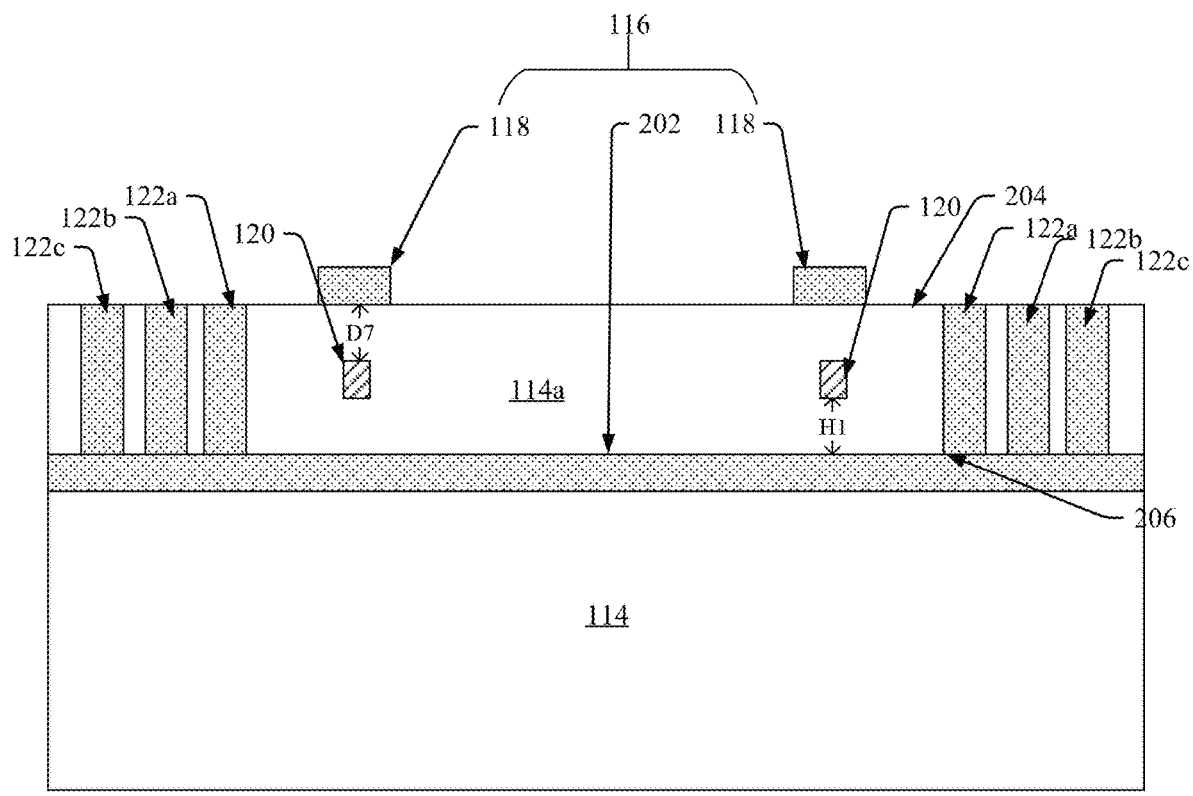
FIG. 4 illustrates a diagram of an example, non-limiting cross-sectional view of a quantum transducer having a microstrip architecture and multiple rows of photon barrier structures in accordance with one or more embodiments described herein.

FIG. 4 illustrates a diagram of an example, non-limiting cross-sectional view of the quantum transducer 100 in accordance with one or more embodiments described herein. Repetitive description of like elements employed in other embodiments described herein is omitted for sake of brevity. FIG. 4 can depict a cross-section of the quantum transducer 100 along the A-A' plane depicted in FIG. 1A. As shown in FIG. 4, the quantum transducer can 100 can comprise a one or more rows of photon barrier structures 122. Additionally, while FIG. 2 exemplifies the one or more photon barrier structures 122 comprising a different material than the microwave resonator 116 (e.g., exemplifies the one or more photon barrier structures 122 comprising degenerately doped polysilicon); FIG. 4 exemplifies the one or more photon barrier structures 122 comprising the same, or substantially the same, composition as the microwave resonator 116 (e.g., exemplifies the one or more photon barrier structures 122 comprising a superconducting material, such as niobium).

In various embodiments, multiple photon barrier structures 122 can be arranged in rows to provide additional shielding to the one or more microwave resonators 116 and/or optical resonators 120. For example, FIG. 4 depicts an exemplary embodiment comprising three rows (e.g., first row 122a, second row 122b, and/or third row 122c) of photon barrier structures 122 that extend alongside one another and that at least partially surround the optical resonator 120. As shown in FIG. 4, each row of the one or more photon barrier structures 122 can extend from the superconducting ground plane 202, through the first portion 114a of the dielectric substrate 114 (e.g., adjacent to the one or more optical resonators 120), to the first surface 204 of the first portion 114a of the dielectric substrate 114. Thereby, the plurality of rows of the one or more photon barrier structures 122 can at least partially surround (e.g., on a horizontal plane) the one or more microwave resonators 116 and/or optical resonators 120.

In one or more embodiments, each row of the photon barrier structures 122 can have the same, or substantially the same, composition. Alternatively, in some embodiments, one or more rows of the photon barrier structures 122 can have a different composition than one or more other rows of the photon barrier structures 122. In one or more embodiments, the one or more rows of photon barrier structures 122 can be horizontally spaced (e.g., along the "X" axis shown in FIG. 4) a part by a distance ranging from, for example, greater than or equal to 5 µm and less than or equal to 50 µm. In one or more embodiments, the distance between adjacent rows of the photon barrier structures 122 (e.g., along the "X" axis shown in FIG. 4) can be equivalent, or substantially equivalent. Alternatively, in one or more embodiments the distance between a first set of adjacent rows of the photon barrier structures 122 (e.g., along the "X" axis shown in FIG. 4) can be different than the distance between a second set of adjacent rows of the photon barrier structures 122.

Although FIG. 4 depicts three exemplary rows of photon barrier structures 122, the architecture of the quantum transducer 100 is not so limited. For instance, embodiments in which the quantum transducer 100 comprises a plurality of rows of photon barrier structures 122 ranging from, for example, greater than or equal to two rows and less than or equal to 20 rows is also envisaged. Additionally, while FIG. 4 depicts a plurality of rows of the photon barrier structures 122 with regards to a microstrip architecture of the microwave resonator 116, the architecture of the quantum inducer is not so limited. For example, embodiments in which the quantum transducer 100 includes multiple rows of the photon barrier structures 122 with regards to a CPW architecture of the microwave resonator 116 are also envisaged.

Figure 5:
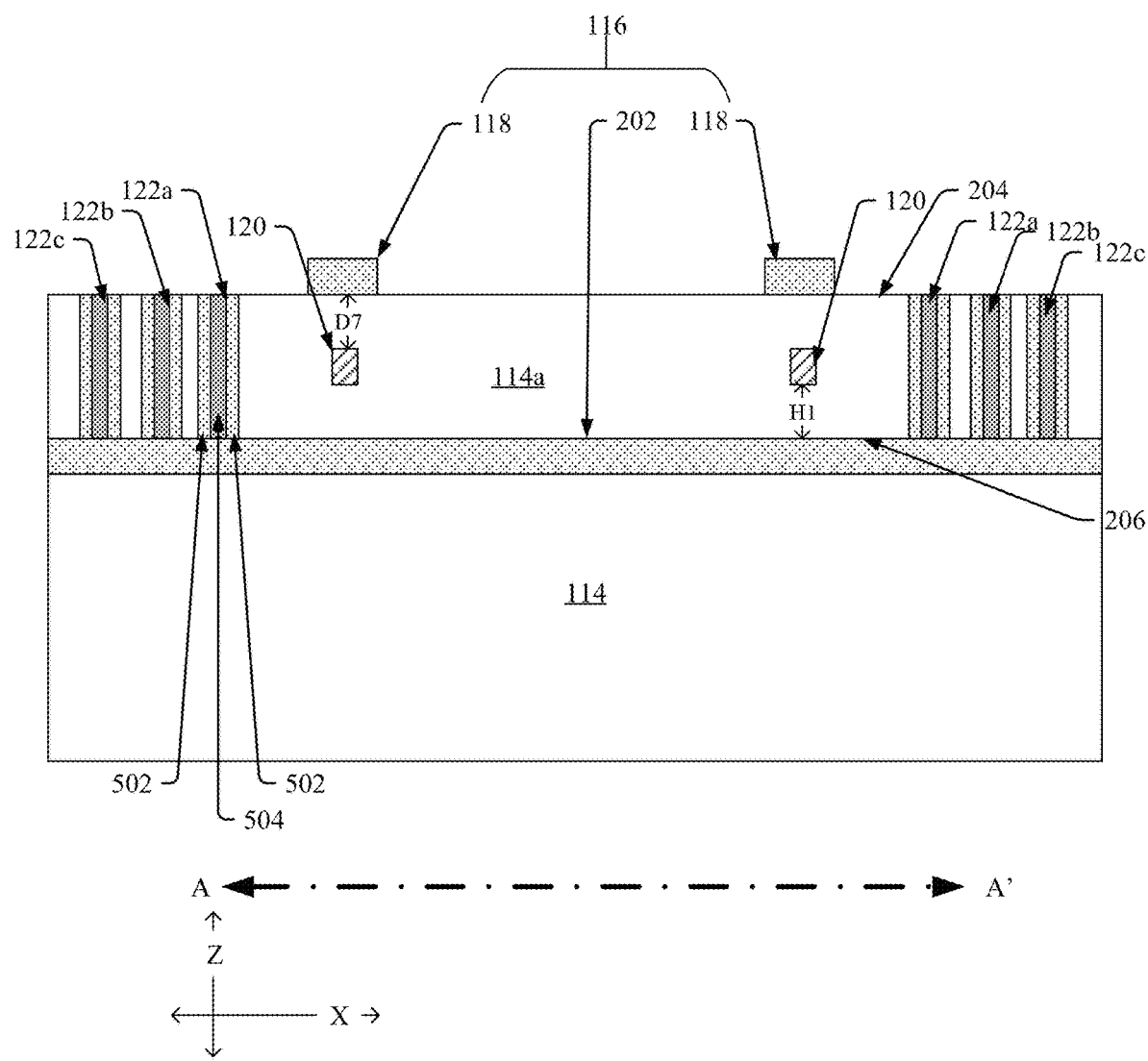
FIG. 5 illustrates a diagram of an example, non-limiting cross-sectional view of a quantum transducer having a microstrip architecture and one or more photon barrier structures comprising two or more materials in accordance with one or more embodiments described herein.

FIG. 5 illustrates a diagram of an example, non-limiting cross-sectional view of the quantum transducer 100 in accordance with one or more embodiments described herein. Repetitive description of like elements employed in other embodiments described herein is omitted for sake of brevity. FIG. 5 can depict a cross-section of the quantum transducer 100 along the A-A' plane depicted in FIG. 1A. As shown in FIG. 5, the one or more photon barrier structures 122 can further comprise one or more liners 502 positioned between a core 504 of the photon barrier structures 122 and the adjacent dielectric substrate 114.

For example, a liner 502 can be positioned at each side wall of the one or more photon barrier structures 122 adjacent to the surrounding dielectric substrate 114. Further, the core 504 of the one or more photon barrier structures 122 can be positioned between adjacent liners 502 (e.g., as shown in FIG. 5). Additionally, the one or more liners 502 can comprise a different material than the one or more cores 504. Thereby, the one or more photon barrier structures 122 can be multi-compositional. For instance, FIG. 5 depicts an exemplary embodiment in which the one or more liners 502 can comprise a superconducting material, such as niobium; while the one or more cores 504 can comprise a different material, such as degenerately doped polysilicon. In various embodiments, the width of the one or more liners 502 (e.g., along the "X" axis shown in FIG. 5) can range from, for example, greater than or equal to 50 nm and less than or equal to 500 nm. In various embodiments, the width of the one or more cores 504 (e.g., along the "X" axis shown in FIG. 5) can range from, for example, greater than or equal to 1 µm and less than or equal to 10 µm.

Additionally, while FIG. 5 depicts multi-compositional photon barrier structures 122 with regards to a microstrip architecture of the microwave resonator 116, the architecture of the quantum inducer is not so limited. For example, embodiments in which the quantum transducer 100 includes multi-compositional photon barrier structures 122 with regards to a CPW architecture of the microwave resonator 116 are also envisaged.

Figure 6:
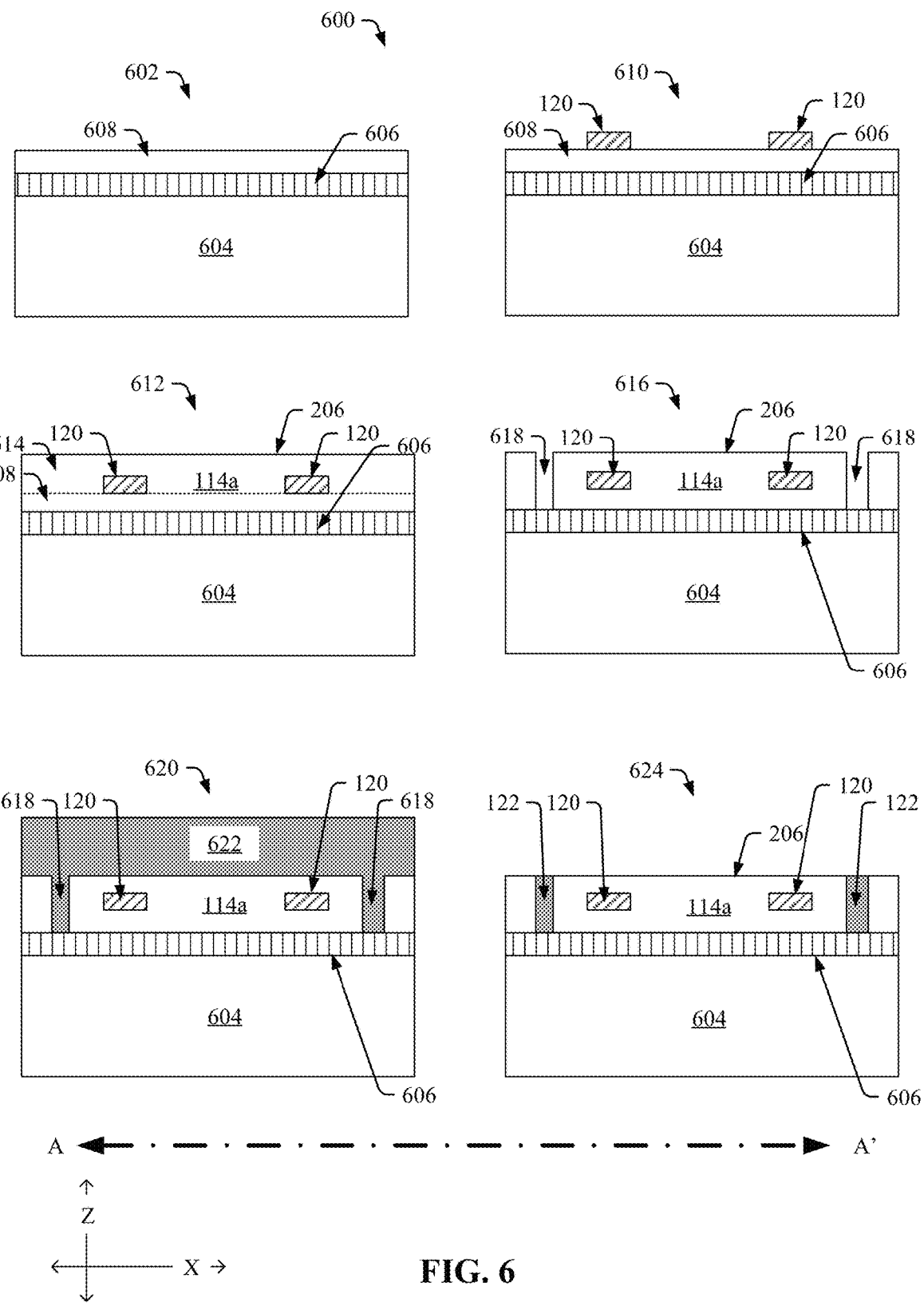
FIG. 6 illustrates a diagram of example, non-limiting stages of manufacturing one or more quantum transducers comprising one or more photon barrier structures from a silicon-on-insulator ("SOI") wafer in accordance with one or more embodiments described herein.

FIG. 6 depicts a diagram of example, non-limiting cross-sectional views of a quantum transducer 100 during multiple stages of a first manufacturing process 600 in accordance with one or more embodiments described herein. Repetitive description of like elements employed in other embodiments described herein is omitted for sake of brevity. FIG. 6 can depict a cross-section of the quantum transducer 100 along the A-A' plane depicted in FIG. 1A during various stages of manufacturing. The stages of manufacturing depicted in FIG. 6 can be implemented to manufacture the various quantum transducer embodiments described herein. For example, the stages of manufacturing depicted in FIG. 6 can be implemented to manufacture the quantum transducer 100 comprising one or more microwave resonators 116 having a microstrip architecture or a CPW architecture (e.g., as described herein). In another example, the stages of manufacturing depicted in FIG. 6 can be implemented to manufacture the quantum transducer 100 comprising a single photon barrier structure 122 surrounding the one or more microwave resonators 116 and/or optical resonators 120 or comprising multiple rows of photon barrier structures 122 (e.g., as described herein).

At a first stage 602 of the first manufacturing process 600, a SOI wafer can be provided. For example, the SOI wafer can comprise a handle layer 604, a buried oxide layer 606, and/or a device layer 608. For instance, the buried oxide layer 606 can comprise a metal oxide. Also, the handle layer 604 and/or the device layer 608 can comprise the same, or substantially the same, material as the dielectric substrate 114 (e.g., can comprise silicon and/or sapphire). In various embodiments, the device layer 608 can be at least a portion of the dielectric substrate 114. At a second stage 610 of the first manufacturing process 600, the one or more optical resonators 120 can be deposited and/or patterned onto the device layer 608. For example, the one or more optical resonators 120 can be grown on the device layer 608 via one or more epitaxial growth processes, where the epitaxial growth can be further patterned via one or more lithography processes to achieve the desired optical resonator 120 dimensions. For instance, the one or more optical resonators 120 can comprise silicon germanium (e.g., $Si_{1-x}Ge_x$, a crystalline alloy of silicon and germanium) grown on the device layer 608 and patterned via one or more lithography processes. In one or more embodiments, lithographic patterning of the epitaxial growth (e.g., patterning of the silicon germanium) can form the one or more optical resonators 120 and/or optical waveguides 104.

At a third stage 612 of the first manufacturing process 600, one or more cladding layers 614 can be deposited onto the one or more optical resonators 120 and/or optical waveguides 104 to form the first portion 114a of the dielectric substrate 114. In one or more embodiments, the one or more cladding layers 614 can be have the same, or substantially same, composition as the dielectric substrate 114 and/or can be gown (e.g., via one or more epitaxial growth processes) on the device layer 608, the one or more optical resonators 120, and/or the one or more optical waveguides 104. For instance, the one or more cladding layers 614 can be one or more grown silicon layers. FIG. 6 depicts a dashed line in the third stage 612 to delineate the location of the device layer 608 and cladding layers 614; thereby, exemplifying the formation of the first portion 114a of the dielectric substrate 114. Further, at the third stage 612, the one or more cladding layers 614 can be polished (e.g., via CMP) to form the second surface 206 of the first portion 114a of the dielectric substrate 114.

At a fourth stage 616 of the first manufacturing process 600, one or more trenches 618 can be formed in the first portion 114a of the dielectric substrate 114 at the future position of the one or more photon barrier structures 122. In various embodiments, the one or more trenches 618 can be formed via one or more etching processes. As shown in FIG. 6, the one or more trenches 618 can extend from the second surface 206 to the buried oxide layer 604. In one or more embodiments, the buried oxide layer 604 can resist the one or more etching processes to control a depth of the one or more trenches 618. The dimensions and/or position of the one or more trenches 618 can correspond to the dimensions and/or position of the one or more photon barrier structures 122 of the manufactured quantum transducer 100.

At a fifth stage 620 of the first manufacturing process 600, one or more photon absorbing materials 622 can be deposited onto the first portion 114a of the dielectric substrate 114 and/or into the one or more trenches 618. For example, the one or more photon absorbing materials 622 can comprise the material for forming the one or more photon barrier structures 122. For instance, the one or more photon absorbing materials 622 can be degenerately doped polysilicon. In various embodiments, the one or more photon absorbing materials 622 can be deposited via one or more deposition processes. Where the one or more photon absorbing layers 122 being formed are multi-compositional (e.g., comprise one or more liners 502 and/or cores 504), depositing the one or more photon absorbing materials 622 can be performed via multiple deposition processes. For example, a first deposition process can deposit a first type of photon absorbing material 622 for forming the one or more liners 502, while a second deposition process can deposit a second type of photon absorbing material 622 for forming the one or more cores 504 onto the first type of photon absorbing material 622.

At a sixth stage 624 of the first manufacturing process 600, the one or more deposited photon absorbing materials 622 can be removed from the second surface 206 of the first portion 114a of the dielectric substrate 114 via one or more etching processes and/or polishing processes (e.g., CMP) to form the one or more photon absorbing layers 122. For example, the one or more photon absorbing materials 622 positioned in the one or more trenches 618 can remain present despite the one or more etching and/or polishing processes at the sixth stage 624, thereby forming the one or more photon barrier structures 122.

Figure 7:
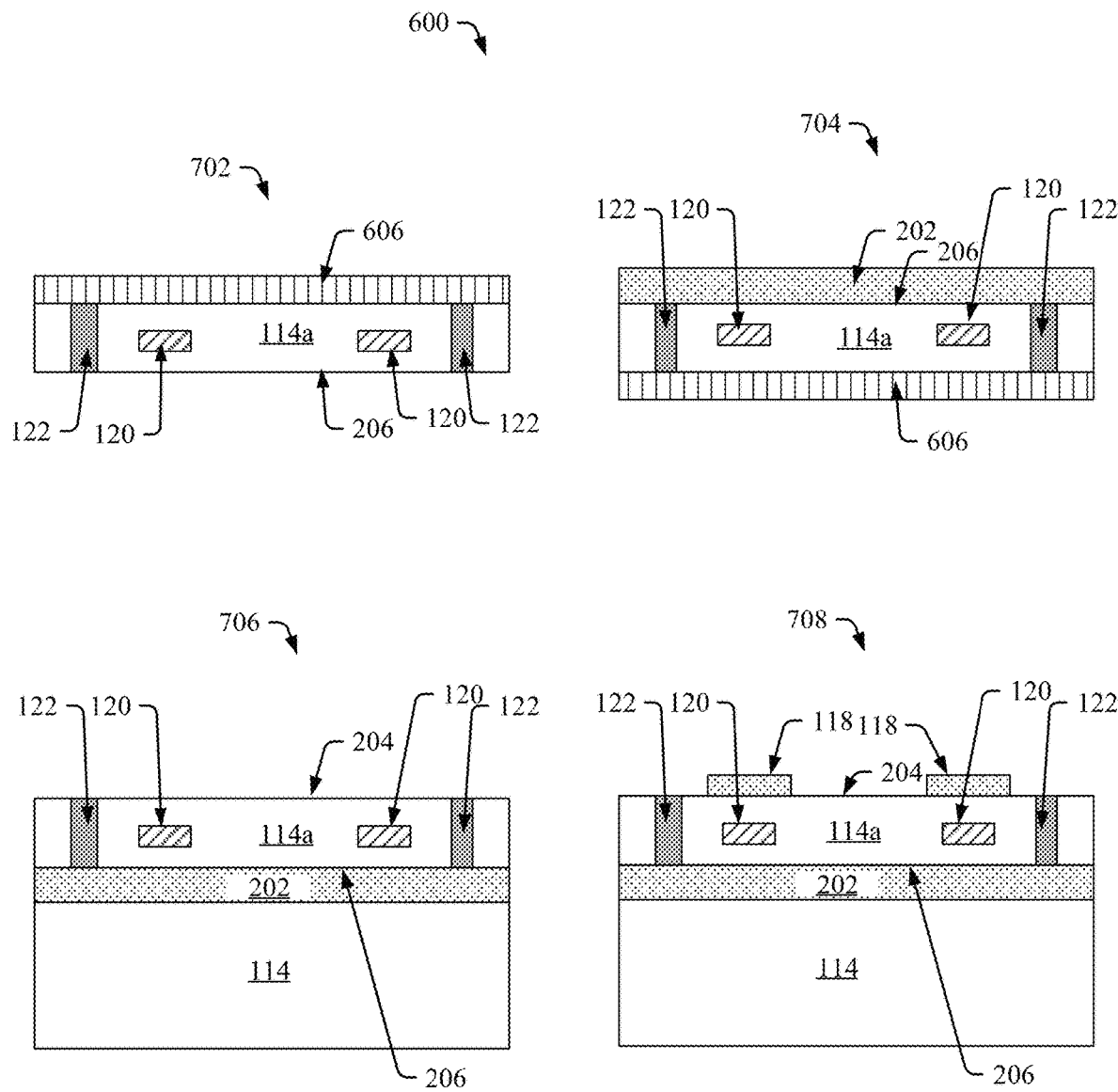
FIG. 7 illustrates a diagram of example, non-limiting stages of manufacturing one or more quantum transducers comprising one or more photon barrier structures from a SOI wafer in accordance with one or more embodiments described herein.

FIG. 7 depicts a diagram of example, non-limiting cross-sectional views of a quantum transducer 100 during multiple stages of the first manufacturing process 600 in accordance with one or more embodiments described herein. Repetitive description of like elements employed in other embodiments described herein is omitted for sake of brevity. FIG. 7 can depict a cross-section of the quantum transducer 100 along the A-A' plane depicted in FIG. 1A during various stages of manufacturing. In various embodiments, the stages of manufacturing depicted in FIG. 7 can continue the first manufacturing process 600 depicted in FIG. 6.

At a seventh stage 702 of the first manufacturing process 600, the handle layer 604 can be removed from the buried oxide layer 606 via one or more etching processes and/or polishing processes (e.g., CMP). For example, the SOI wafer can be flipped, and the handle layer 604 can be removed via one or more etching processes. At an eighth stage 704 of the first manufacturing process 600, superconducting material can be deposited onto the second surface 206 of the first portion 114a of the dielectric substrate 114 via one or more deposition processes to form the superconducting ground plane 202. As shown in FIG. 7, the superconducting material can be deposited such that the superconducting ground plane 202 covers the one or more photon barrier structures 122.

At a ninth stage 706 of the first manufacturing process 600, a wafer can be bonded to the superconducting ground plane 202 to further form the dielectric substrate 114. Additionally, the quantum transducer 100 can be flipped again, and the buried oxide layer 606 can be removed via one or more etching processes and/or polishing processes (e.g., CMP) to form the first surface 204 of the first portion 114a of the dielectric substrate 114. In one or more embodiments, the top surface of the one or more photon barrier structures 122 can be etched to position the distal end of the photon barrier structures 122 slightly below the first surface 204 of the first portion 114a of the dielectric substrate 114.

At the tenth stage 708 of the first manufacturing process 600, superconducting material can be deposited (e.g., via one or more deposition processes) and/or patterned (e.g., via one or more lithography processes) onto the first surface 204 of the first portion 114a of the dielectric substrate 114 to form the one or more superconducting waveguides 118 and/or microwave transmission lines 102. In one or more embodiments, the tenth stage 708 of the first manufacturing process 600 can also comprise depositing (e.g., via the deposition process) and/or patterning (e.g., via the lithography process) one or more second superconducting ground planes 302 onto the first surface 204 of the first portion 114a of the dielectric substrate 114.

Figure 8:
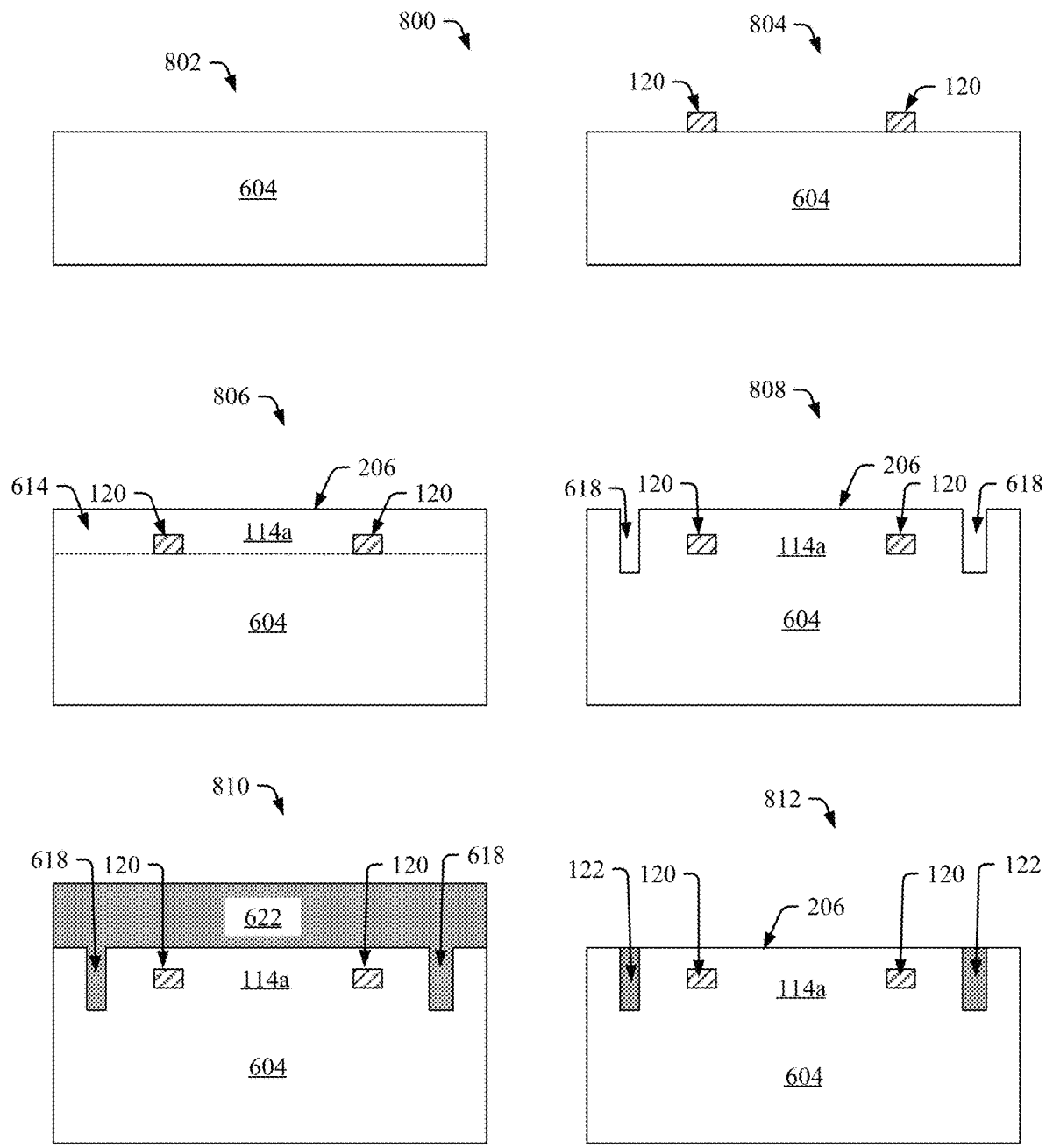
FIG. 8 illustrates a diagram of example, non-limiting stages of manufacturing one or more quantum transducers comprising one or more photon barrier structures from a silicon wafer in accordance with one or more embodiments described herein.
Figure 8:
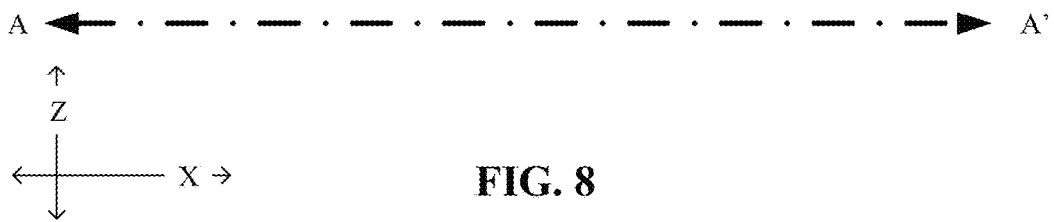

FIG. 8 depicts a diagram of example, non-limiting cross-sectional views of a quantum transducer 100 during multiple stages of a second manufacturing process 800 in accordance with one or more embodiments described herein. Repetitive description of like elements employed in other embodiments described herein is omitted for sake of brevity. FIG. 8 can depict a cross-section of the quantum transducer 100 along the A-A' plane depicted in FIG. 1A during various stages of manufacturing. The stages of manufacturing depicted in FIG. 8 can be implemented to manufacture the various quantum transducer embodiments described herein. For example, the stages of manufacturing depicted in FIG. 8 can be implemented to manufacture the quantum transducer 100 comprising one or more microwave resonators 116 having a microstrip architecture or a CPW architecture (e.g., as described herein). In another example, the stages of manufacturing depicted in FIG. 8 can be implemented to manufacture the quantum transducer 100 comprising a single photon barrier structure 122 surrounding the one or more microwave resonators 116 and/or optical resonators 120 or comprising multiple rows of photon barrier structures 122 (e.g., as described herein).

At a first stage 802 of the second manufacturing process 800, a wafer (e.g., a silicon wafer) can be provided to surface as a handle layer 604 and/or support for subsequent depositions. At a second stage 804 of the second manufacturing process 800, the one or more optical resonators 120 can be deposited and/or patterned onto the handle layer 604. For example, the one or more optical resonators 120 can be grown on the handle layer 604 via one or more epitaxial growth processes, where the epitaxial growth can be further patterned via one or more lithography processes to achieve the desired optical resonator 120 dimensions. For instance, the one or more optical resonators 120 can comprise silicon germanium (e.g., $Si_{1-x}Ge_x$, a crystalline alloy of silicon and germanium) grown on the handle layer 604 and patterned via one or more lithography processes. In one or more embodiments, lithographic patterning of the epitaxial growth (e.g., patterning of the silicon germanium) can form the one or more optical resonators 120 and/or optical waveguides 104.

At a third stage 806 of the second manufacturing process 800, one or more cladding layers 614 can be deposited onto the one or more optical resonators 120 and/or optical waveguides 104 to form the first portion 114a of the dielectric substrate 114. In one or more embodiments, the one or more cladding layers 614 can be have the same, or substantially same, composition as the dielectric substrate 114 and/or can be gown (e.g., via one or more epitaxial growth processes) on the handle layer 604, the one or more optical resonators 120, and/or the one or more optical waveguides 104. For instance, the one or more cladding layers 614 can be one or more grown silicon layers. FIG. 8 depicts a dashed line in the third stage 806 to delineate the location of the handle layer 604 and cladding layers 614; thereby, exemplifying the formation of the first portion 114a of the dielectric substrate 114. Further, at the third stage 806, the one or more cladding layers 614 can be polished (e.g., via CMP) to form the second surface 206 of the first portion 114a of the dielectric substrate 114.

At a fourth stage 808 of the second manufacturing process 800, one or more trenches 618 can be formed in the first portion 114a of the dielectric substrate 114 at the future position of the one or more photon barrier structures 122. In various embodiments, the one or more trenches 618 can be formed via one or more etching processes. As shown in FIG. 8, the one or more trenches 618 can extend from the second surface 206. The depth of the one or more trenches 618 can correlate to a desired thickness (e.g., along the "Z" axis) of the one or more photon barrier structures 122. The dimensions and/or position of the one or more trenches 618 can correspond to the dimensions and/or position of the one or more photon barrier structures 122 of the manufactured quantum transducer 100.

At a fifth stage 810 of the second manufacturing process 800, one or more photon blocking/absorbing materials 622 can be deposited onto the first portion 114a of the dielectric substrate 114 and/or into the one or more trenches 618. For example, the one or more photon blocking/absorbing materials 622 can comprise the material for forming the one or more photon barrier structures 122. For instance, the one or more photon blocking/absorbing materials 622 can be degenerately doped polysilicon metallic materials, or combinations thereof, such as described elsewhere herein. In various embodiments, the one or more photon blocking/absorbing materials 622 can be deposited via one or more deposition processes. Where the one or more photon barrier structures 122 being formed are multi-compositional (e.g., comprise one or more liners 502 and/or cores 504), depositing the one or more photon blocking/absorbing materials 622 can be performed via multiple deposition processes. For example, a first deposition process can deposit a first type of photon blocking/absorbing material 622 for forming the one or more liners 502, while a second deposition process can deposit a second type of photon blocking/absorbing material 622 for forming the one or more cores 504 onto the first type of photon blocking/absorbing material 622.

At a sixth stage 812 of the second manufacturing process 800, the one or more deposited photon blocking/absorbing materials 622 can be removed from the second surface 206 of the first portion 114a of the dielectric substrate 114 via one or more etching processes and/or polishing processes (e.g., CMP) to form the one or more photon barrier structures 122. For example, the one or more photon blocking/absorbing materials 622 positioned in the one or more trenches 618 can remain present despite the one or more etching and/or polishing processes at the sixth stage 812, thereby forming the one or more photon barrier structures 122.

Figure 9:
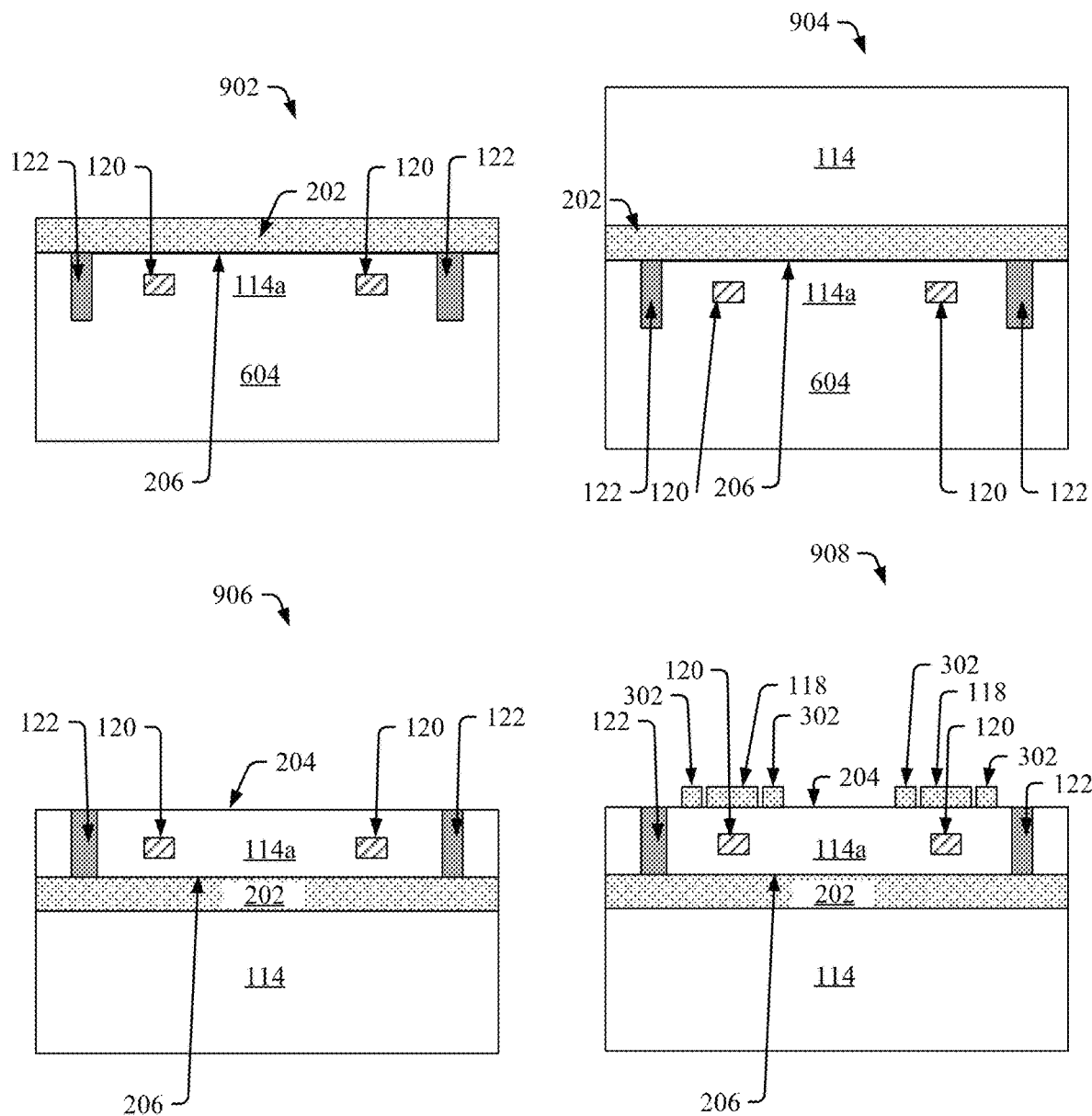
FIG. 9 illustrates a diagram of example, non-limiting stages of manufacturing one or more quantum transducers comprising one or more photon barrier structures from a silicon wafer in accordance with one or more embodiments described herein.

FIG. 9 depicts a diagram of example, non-limiting cross-sectional views of a quantum transducer 100 during multiple stages of the second manufacturing process 800 in accordance with one or more embodiments described herein. Repetitive description of like elements employed in other embodiments described herein is omitted for sake of brevity. FIG. 9 can depict a cross-section of the quantum transducer 100 along the A-A' plane depicted in FIG. 1A during various stages of manufacturing. In various embodiments, the stages of manufacturing depicted in FIG. 9 can continue the second manufacturing process 800 depicted in FIG. 8.

At a seventh stage 902 of the second manufacturing process 900, superconducting material can be deposited onto the second surface 206 of the first portion 114a of the dielectric substrate 114 via one or more deposition processes to form the superconducting ground plane 202. As shown in FIG. 9, the superconducting material can be deposited such that the superconducting ground plane 202 covers the one or more photon barrier structures 122.

At an eighth stage 904 of the second manufacturing process 900, a wafer (e.g., a silicon wafer) can be bonded to the superconducting ground plane 202 to further form the dielectric substrate 114. At a ninth stage 906 of the second manufacturing process 900, the quantum transducer 100 can be flipped, and the handle layer 604 can be removed via one or more etching processes to form the first surface 204 of the first portion 114a of the dielectric substrate 114. For example, the one or more etching processes can remove the handle layer 604 down to the depth of the one or more photon barrier structures 122. In one or more embodiments, the top surface of the one or more photon barrier structures 122 can be etched to position the distal end of the photon barrier structures 122 slightly below the first surface 204 of the first portion 114a of the dielectric substrate 114. At the tenth stage 908 of the second manufacturing process 900, superconducting material can be deposited (e.g., via one or more deposition processes) and/or patterned (e.g., via one or more lithography processes) onto the first surface 204 of the first portion 114a of the dielectric substrate 114 to form the one or more superconducting waveguides 118, second superconducting ground planes 302, and/or microwave transmission lines 102.

FIG. 10 illustrates a flow diagram of an example, non-limiting manufacturing method 1000 that can facilitate manufacturing one or more quantum transducers 100 in accordance with one or more embodiments described herein. Repetitive description of like elements employed in other embodiments described herein is omitted for sake of brevity.

At 1002, the method 1000 can comprise forming one or more optical resonators 120 within a dielectric substrate 114 (e.g., within the first portion 114a of the dielectric substrate 114). For example, forming the one or more optical resonators 120 at 1002 can be performed in accordance with the first stage 602, second stage 610, and/or third stage 612 of the first manufacturing process 600 in accordance with various embodiments described herein. In another example, the forming the one or more optical resonators 120 at 1002 can be performed in accordance with the first stage 802, second stage 804, and/or third stage 806 of the second manufacturing process 800. For instance, the one or more optical resonators 120 can be formed via one or more epitaxial growth process, and one or more cladding layers 614 can extend a dielectric substrate 114 around the one or more optical resonators 120 (e.g., such that the one or more optical resonators 120 are positioned within the resulting dielectric substrate 114 structure).

At 1004, the method 1000 can comprise forming one or more photon barrier structures 122 within the dielectric substrate 114. The one or more photon barrier structures 122 can at least partially surround (e.g., along a horizontal plane, such as the "X" axis shown in FIG. 1A) the one or more optical resonators 120 formed at 1002. For example, forming the one or more photon barrier structures 122 at 1004 can be performed in accordance with the fourth stage 616, fifth stage 620, and/or sixth stage 624 of the first manufacturing process 600 in accordance with various embodiments described herein. In another example, the forming the one or more photon barrier structures 122 at 1004 can be performed in accordance with the fourth stage 808, fifth stage 810, and/or sixth stage 812 of the second manufacturing process 800. For instance, the one or more photon barrier structures 122 can be formed by etching one or more trenches 618 into the dielectric substrate 114, and filling the one or more trenches 618 with a photon absorbing material 622 (e.g., such as degenerately doped polysilicon and/or niobium).

At 1006, the method 1000 can comprise forming one or more superconducting microwave resonators 116 on the dielectric substrate 114. For example, forming the one or more superconducting microwave resonators 116 at 1006 can be performed in accordance with the seventh stage 702, eighth stage 704, ninth stage 706, and/or tenth stage 708 of the first manufacturing process 600 in accordance with various embodiments described herein. In another example, the forming the one or more superconducting microwave resonator 116 at 1006 can be performed in accordance with the seventh stage 902, eighth stage 904, ninth stage 906, and/or tenth stage 908 of the second manufacturing process 800. For instance, the one or more superconducting microwave resonator 116 can be formed by depositing and/or patterning one or more superconducting waveguides 118 and a superconducting ground plane 202 on opposing sides of the dielectric substrate 114. In another instance, the one or more superconducting microwave resonator 116 can be formed by depositing and/or patterning one or more superconducting waveguide 118 and second superconducting ground planes 302 on a first surface 204 of the dielectric substrate 114, and another superconducting ground plane 202 on a second surface 206 of the dielectric substrate 114.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is, of course, not possible to describe every conceivable combination of components, products and/or methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
    a microwave resonator on a dielectric substrate and adjacent to an optical resonator; and
    a photon barrier structure at least partially surrounding the optical resonator,
    the photon barrier structure configured to provide isolation of the microwave resonator from optical photons in the dielectric substrate outside the photon barrier structure.

2. The apparatus of claim 1, wherein the microwave resonator comprises a superconducting waveguide positioned on a first surface of the dielectric substrate and a superconducting ground plane positioned on a second surface of the dielectric substrate, and wherein the first surface and the second surface are located at opposite sides of the dielectric substrate.

3. The apparatus of claim 2, wherein the photon barrier structure extends within the dielectric substrate from the superconducting ground plane to the first surface.

4. The apparatus of claim 2, wherein the photon barrier structure comprises at least one material selected from the group consisting of degenerated-doped polysilicon, niobium, niobium nitride, and titanium nitride.

5. The apparatus of claim 4, wherein the superconducting waveguide comprises at least one superconducting material selected from the group consisting of niobium, niobium nitride, and titanium nitride, and wherein the optical resonator comprises at least one member from the group consisting of silicon germanium, lithium niobate, and aluminum nitride.

6. The apparatus of claim 1, wherein the photon barrier structure comprises an optical photon absorbing material in a trench in the dielectric substrate.

7. The apparatus of claim 1, comprising a plurality of photon barrier structures that extend alongside one another and that at least partially surround the optical resonator.

8. The apparatus of claim 7, the plurality of photon barrier structures comprising a first photon barrier structure and a second photon barrier structure, wherein the first photon barrier structure and the second photon barrier structure are spaced apart by a distance greater than or equal to 1 micrometer and less than or equal to 10 micrometers.

9. An apparatus, comprising:
    a dielectric substrate;
    a microwave resonator on the dielectric substrate, the microwave resonator including a superconducting waveguide;
    an optical resonator in the dielectric substrate; and a photon barrier structure at least partially surrounding the optical resonator.

10. The apparatus of claim 9, wherein the microwave resonator further includes a superconducting ground plane, wherein the superconducting waveguide is positioned on a first surface of the dielectric substrate and the superconducting ground plane is positioned on a second surface of the dielectric substrate, and wherein the first surface and the second surface are located at opposite sides of the dielectric substrate.

11. The apparatus of claim 10, wherein the photon barrier structure extends within the dielectric substrate from the superconducting ground plane to the first surface.

12. The apparatus of claim 9, wherein the photon barrier structure comprises a metallic material in a trench in the dielectric substrate.

13. The apparatus of claim 9, wherein the photon barrier structure comprises at least one material selected from the group consisting of degenerated-doped polysilicon, niobium, niobium nitride, and titanium nitride, and wherein the superconducting waveguide comprises at least one superconducting material selected from the group consisting of niobium, niobium nitride, and titanium nitride, and wherein the optical resonator comprises at least one member from the group consisting of silicon germanium, lithium niobate, and aluminum nitride.

14. The apparatus of claim 9, comprising a plurality of photon barrier structures that extend alongside one another and that at least partially surround the optical resonator.

15. The apparatus of claim 14, the plurality of photon barrier structures comprising a first photon barrier structure and a second photon barrier structure in the dielectric substrate and at least partially surrounding the optical resonator, wherein the first photon barrier structure and the second photon barrier structure are spaced apart by a distance greater than or equal to 1 micrometer and less than or equal to 10 micrometers.

16. A method, comprising:
forming an optical resonator in a dielectric substrate;
forming a photon barrier structure in the dielectric substrate, wherein the photon barrier structure at least partially surrounds the optical resonator; and
forming a superconducting microwave resonator on the dielectric substrate.

17. The method of claim 16, wherein the optical resonator is formed via an epitaxial growth process on a surface of the dielectric substrate, and the method further comprises:
extending the dielectric substrate by depositing a dielectric cladding layer onto the surface and the optical resonator.

18. The method of claim 17, wherein:
forming the photon barrier structure comprises forming a trench in the dielectric cladding layer and depositing a material comprising at least one member selected from the group consisting of degenerated-doped polysilicon, niobium, niobium nitride, and titanium nitride into the trench.

19. The method of claim 18, further comprising:
forming a superconducting waveguide on a first surface of the dielectric cladding layer; and
forming a superconducting ground plane on a second surface of the dielectric substrate, wherein the superconducting waveguide and the superconducting ground plane are included within the superconducting microwave resonator and comprise at least one superconducting material selected from the group consisting of niobium, niobium nitride, and titanium nitride.

20. The method of claim 19, wherein forming the photon barrier structure comprises forming a trench in the dielectric substrate and depositing photon absorbing material into the trench.

* * * * *